United States Patent
Parsekar et al.

(10) Patent No.: US 10,811,987 B2
(45) Date of Patent: Oct. 20, 2020

(54) BI-DIRECTIONAL DC-DC CONVERTER WITH LOAD AND SOURCE SYNCHRONIZED POWER CONTROL

(71) Applicant: SCHNEIDER ELECTRIC IT CORPORATION, West Kingston, RI (US)

(72) Inventors: Sachin Mahadev Parsekar, Maharashtra (IN); Milind Dighrasker, Bangalore (IN)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 0 days.

(21) Appl. No.: 15/475,477

(22) Filed: Mar. 31, 2017

(65) Prior Publication Data

US 2018/0287504 A1    Oct. 4, 2018

(51) Int. Cl.
*H02M 5/42* (2006.01)
*H02M 3/335* (2006.01)
(Continued)

(52) U.S. Cl.
CPC ............ *H02M 5/42* (2013.01); *H02J 9/061* (2013.01); *H02M 3/335* (2013.01); *H02M 7/487* (2013.01); *H02M 3/337* (2013.01)

(58) Field of Classification Search
CPC .. H02J 9/061; H02J 50/12; H02J 7/025; H02J 7/0068; H02M 5/42; H02M 7/487;
(Continued)

(56) References Cited

U.S. PATENT DOCUMENTS 6,222,344 B1 *  4/2001  Peterson ............... H02J 7/0014
                                                320/119
9,595,876 B2    3/2017  Nielsen
(Continued)

FOREIGN PATENT DOCUMENTS

CN       105207486 A    12/2015
EP         2325994 A2    5/2011
(Continued)

OTHER PUBLICATIONS

U.S. Appl. No. 15/292,461, filed Oct. 13, 2016, Jonas Sonsby Mouridsen.
(Continued)

*Primary Examiner* — Gustavo A Rosario-Benitez
(74) *Attorney, Agent, or Firm* — Lando & Anastasti, LLP

(57) ABSTRACT

A power converter system is provided and includes a first switch circuit configured to receive a first Direct Current (DC) voltage, the first switch circuit coupled to a second switch circuit having a positive connection and a negative connection to receive a second DC voltage. The power converter system further includes a first capacitor, coupled between the positive connection and a neutral point, a second capacitor, coupled between the negative connection and the neutral point, and an Alternating Current (AC) switch circuit coupled to the first capacitor and to the second capacitor. The power converter system includes a controller configured to maintain a substantially equal voltage level across the first capacitor and the second capacitor, the controller being coupled to the first switch circuit, the second switch circuit, and the AC switch. A method of controlling the power converter system is further disclosed.

20 Claims, 10 Drawing Sheets

(51) Int. Cl.
*H02J 9/06* (2006.01)
*H02M 7/487* (2007.01)
*H02M 3/337* (2006.01)

(58) Field of Classification Search
CPC ............... H02M 1/32; H02M 3/33584; H02M 3/33507; H02M 3/33523; H02M 1/08; H02M 7/66; H02M 7/68; H02M 7/757
See application file for complete search history.

(56) References Cited

U.S. PATENT DOCUMENTS

| | | | | |
|---|---|---|---|---|
| 2001/0001535 | A1* | 5/2001 | Johnson, Jr. | ............ H02J 9/061 323/282 |
| 2005/0195622 | A1 | 9/2005 | Lehman et al. | |
| 2008/0197706 | A1* | 8/2008 | Nielsen | ................... H02J 1/102 307/66 |
| 2009/0102295 | A1* | 4/2009 | Petersen | ................ H03F 3/217 307/130 |
| 2010/0054002 | A1* | 3/2010 | Lu | ........................... H02J 9/062 363/37 |
| 2010/0244798 | A1* | 9/2010 | Nakatomi | ............. H02M 3/156 323/282 |
| 2011/0019452 | A1* | 1/2011 | Shinomoto | ......... H02M 1/4208 363/126 |
| 2013/0021827 | A1* | 1/2013 | Ye | ......................... H03F 1/3241 363/17 |
| 2013/0057200 | A1* | 3/2013 | Potts | ................. H02M 3/33584 320/107 |
| 2015/0035360 | A1* | 2/2015 | Marbach | ............... H02J 7/0052 307/23 |
| 2015/0131330 | A1* | 5/2015 | Pan | ......................... H02M 3/07 363/17 |
| 2015/0291035 | A1* | 10/2015 | Nagashita | ............... H02M 1/10 307/9.1 |
| 2016/0105096 | A1* | 4/2016 | Chen | ................... H02M 1/4225 323/210 |
| 2016/0204713 | A1* | 7/2016 | Dwari | ................... H02M 7/217 363/89 |
| 2016/0233777 | A1* | 8/2016 | Murakami | ........ H02M 3/33561 |
| 2016/0294221 | A1* | 10/2016 | Maniktala | ................ H02J 50/12 |
| 2017/0331374 | A1* | 11/2017 | Hoyerby | ................ H02M 3/07 |

FOREIGN PATENT DOCUMENTS

| | | |
|---|---|---|
| JP | 2012139048 A | 7/2012 |
| WO | 2016050645 A1 | 4/2016 |

OTHER PUBLICATIONS

Extended European Search Report from corresponding European Application No. 18162133.5 dated Aug. 16, 2018.

* cited by examiner

BI-DIRECTIONAL DC-DC CONVERTER WITH LOAD AND SOURCE SYNCHRONIZED POWER CONTROL

BACKGROUND OF INVENTION

1. Field of Invention

The present invention relates generally to systems and methods for controlling a DC/DC converter.

2. Discussion of Related Art

The use of power devices, such as Uninterruptible Power Supplies (UPSs), to provide regulated, uninterrupted power for sensitive or critical loads, such as computer systems and other data processing systems, is known. Furthermore, it is known for a UPS to provide output power in one of various forms including, for example, Direct Current (DC) power, Alternating Current (AC) power, rectified half-wave AC power, and so forth, to meet the specific demands of various loads. UPSs often include at least one DC/DC converter to modulate output power provided to one or more loads.

SUMMARY OF INVENTION

At least one aspect of the invention is directed to a power converter system including a first switch circuit configured to receive a first Direct Current (DC) voltage, a second switch circuit, coupled to the first switch circuit, having a positive connection and a negative connection to receive a second DC voltage, a first capacitor coupled between the positive connection and a neutral point, a second capacitor coupled between the negative connection and the neutral point, an Alternating Current (AC) switch circuit coupled to the first capacitor and to the second capacitor, and a controller coupled to the first switch circuit, the second switch circuit, and the AC switch and configured to control the first switch circuit, the second switch circuit, and the AC switch circuit to maintain a substantially equal voltage level across the first capacitor and across the second capacitor.

In at least one embodiment, the controller is further configured to operate the first switch circuit, the second switch circuit, and the AC switch circuit to provide a first amount of power from a first voltage source providing the first DC voltage to the first capacitor and to provide a second amount of power from the first voltage source to the second capacitor, the first amount of power being substantially equal to an amount of power drawn from the first capacitor and the second amount of power being substantially equal to an amount of power drawn from the second capacitor. In some embodiments, the controller is further configured to operate the first switch circuit, the second switch circuit, and the AC switch circuit to provide a third amount of power to the first voltage source from the first capacitor and to provide a fourth amount of power to the first voltage source from the second capacitor, the third amount of power being based on an amount of power provided to the first capacitor from a second voltage source and the fourth amount of power being based on an amount of power provided to the second capacitor from the second voltage source.

In at least one embodiment, the controller is further configured to operate the first switch circuit, the second switch circuit, and the AC switch circuit to provide, at a given time, power to at most one of the first capacitor and the second capacitor. In an embodiment, the controller is further configured to operate the first switch circuit, the second switch circuit, and the AC switch circuit to draw, at a given time, power from at most one of the first capacitor and the second capacitor. In some embodiments, a transformer is provided having a first primary winding, a second primary winding, a first secondary winding, and a second secondary winding, the transformer being configured to be coupled to the first switch circuit, the second switch circuit, and the AC switch circuit.

In some embodiments, the controller is further configured to operate the first switch circuit, the second switch circuit, and the AC switch circuit to draw a first amount of power from the first capacitor and the second capacitor through the first primary winding and the first secondary winding, the first amount of power being balanced with a second amount of power drawn from the first capacitor and the second capacitor through the second primary winding and the second secondary winding. In an embodiment, the controller is further configured to operate the first switch circuit, the second switch circuit, and the AC switch circuit to provide a first amount of power to the first capacitor and the second capacitor through the first primary winding and the first secondary winding, the first amount of power being balanced with a second amount of power that is provided to the first capacitor and the second capacitor through the second primary winding and the second secondary winding.

According to one embodiment, a method of controlling a power converter is provided, the method comprising acts of detecting a first voltage across a first capacitor, detecting a second voltage across a second capacitor, actuating, responsive to detecting the first voltage and the second voltage, a first set of one or more switches in at least one of a first switch circuit and a second switch circuit, actuating a second set of one or more switches in an Alternating Current (AC) switch circuit, and individually controlling, responsive to actuating the second set of one or more switches, a respective voltage level across each of the first capacitor and the second capacitor. In some embodiments, the method includes acts of detecting, in a first operating mode, a first amount of power provided to the first capacitor and a second amount of power provided to the second capacitor by a first voltage source, actuating a third set of one or more of the switches in at least one of the first switch circuit and the second switch circuit, and providing, to a second voltage source, a third amount of power from the first capacitor and a fourth amount of power from the second capacitor responsive to the third set of one or more switches being actuated, the first amount of power being based on the third amount of power and the second amount of power being based on the fourth amount of power.

In some embodiments, the method includes acts of, detecting, in a second operating mode, a fifth amount of power drawn from the first capacitor and a sixth amount of power drawn from the second capacitor, actuating a fourth set of one or more of the switches in at least one of the first switch circuit and the second switch circuit, and providing, from the second voltage source, a seventh amount of power to the first capacitor and an eighth amount of power to the second capacitor responsive to the fourth set of one or more switches being actuated, the fifth amount of power being based on the seventh amount of power and the sixth amount of power being based on the eighth amount of power. In at least one embodiment, the method includes acts of controlling the first switch circuit and the second switch circuit to provide power to the second voltage source from at most one of the first capacitor and the second capacitor.

In an embodiment, the method includes acts of controlling the first switch circuit and the second switch circuit to draw power from at most one of the first capacitor and the second capacitor. In some embodiments, the method includes acts of exchanging, by the first switch circuit and the second switch circuit, power with the second switch circuit and the first switch circuit, respectively, through a transformer having a first primary winding, a second primary winding, a first secondary winding, and a second secondary winding. In an embodiment, the method includes acts of operating the first switch circuit and the second switch circuit such that power provided by the first capacitor and the second capacitor through the first primary winding and the first secondary winding is balanced with power provided by the first capacitor and the second capacitor through the second primary winding and the second secondary winding.

In one embodiment, the method includes acts of operating the first switch circuit and the second switch circuit such that power provided to the first capacitor and the second capacitor through the first primary winding and the first secondary winding is balanced with power provided to the first capacitor and the second capacitor through the second primary winding and the second secondary winding. In some embodiments, the method includes acts of maintaining a substantially constant voltage level across each of the first capacitor and the second capacitor.

According to one embodiment, a power converter system is provided including a first switch circuit configured to receive a first DC voltage, a second switch circuit, coupled to the first switch circuit, having a positive connection and a negative connection to receive a second DC voltage, a first capacitor coupled between the positive connection and a neutral point, a second capacitor coupled between the negative connection and the neutral point, and means for controlling the power converter system to maintain a substantially equal voltage level across the first capacitor and the second capacitor. In some embodiments, the means for controlling includes means for individually controlling a respective voltage level of each of the first capacitor and the second capacitor. In an embodiment, the power converter system further includes a transformer having a first primary winding, a second primary winding, a first secondary winding, and a second secondary winding, the transformer being coupled to the first switch circuit, the second switch circuit, and the means for controlling the power converter system.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Figure 1:
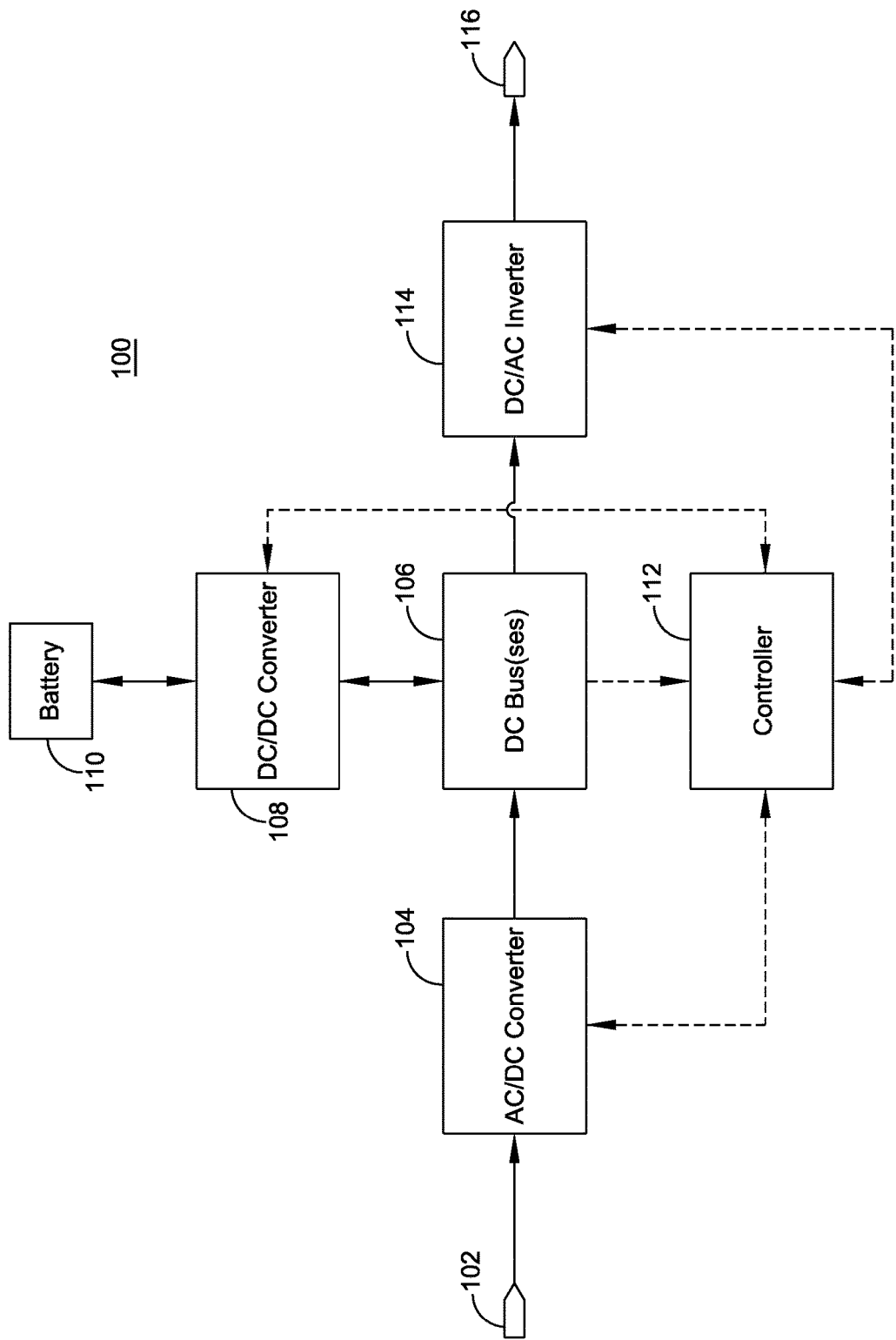
FIG. 1 is a block diagram of a UPS according to one example.

FIG. 1 is a block diagram of a UPS 100. The UPS 100 includes an input 102, an AC/DC converter 104, one or more DC busses 106, a DC/DC converter 108, a battery 110, a controller 112, a DC/AC inverter 114, and an output 116. The input 102 is coupled to the AC/DC converter 104 and an AC power source (not pictured), such as an AC mains power supply. The AC/DC converter 104 is coupled to the input 102 and to the one or more DC busses 106, and is communicatively coupled to the controller 112. The one or more DC busses 106 are coupled to the AC/DC converter 104, the DC/DC converter 108, and to the DC/AC inverter 114, and are communicatively coupled to the controller 112. The DC/DC converter 108 is coupled to the one or more DC busses 106 and to the battery 110, and is communicatively coupled to the controller 112. The battery 110 is coupled to the DC/DC converter 108. The DC/AC inverter 114 is coupled to the one or more DC busses 106 and to the output 116, and is communicatively coupled to the controller 112. The output 116 is coupled to the DC/AC inverter 114, and to an external load (not pictured).

The input 102 is configured to be coupled to an AC mains power source and to receive input AC power having an input voltage level. The UPS 100 is configured to operate in different modes of operation based on the input voltage level of the AC power provided to the input 102. When AC power provided to the input 102 is acceptable (i.e., by having parameters that meet specified values), the UPS 100 operates in a normal mode of operation. In the normal mode of operation, AC power received at the input 102 is provided to the AC/DC converter 104. The AC/DC converter 104 converts the AC power into DC power and provides the DC power to the one or more DC busses 106. The one or more DC busses 106 distribute the DC power to the DC/DC converter 108 and to the DC/AC inverter 114. The DC/DC converter 108 converts the received DC power and provides the converted DC power to the battery 110 to charge the battery 110. The DC/AC inverter 114 receives DC power from the one or more DC busses 106, converts the DC power into regulated AC power, and provides the regulated AC power to the output 116 to be delivered to a load.

When AC power provided to the input 102 from the AC mains power source is not acceptable (i.e., by having parameters that do not meet specified values), the UPS 100 operates in a backup mode of operation. In the backup mode of operation, DC power is discharged from the battery 110 to the DC/DC converter 108. The DC/DC converter 108 converts the received DC power and distributes the DC power amongst the one or more DC busses 106. For example, the DC/DC converter 108 may evenly distribute the power amongst the one or more DC busses 106. The one or more DC busses 106 provide the received power to the DC/AC inverter 114. The DC/AC inverter 114 receives the DC power from the one or more DC busses 106, converts the DC power into regulated AC power, and provides the regulated AC power to the output 116.

During the backup mode of operation, power distributed amongst the one or more DC busses 106 is provided by the battery 110, and during the normal mode of operation, power distributed amongst the one or more DC busses 106 is provided by a power source connected to the input 102. Power distributed amongst the one or more DC busses 106 is subsequently drawn by the DC/AC inverter 114 to supply AC power to an external load connected to the output 116. In at least one example, the one or more DC busses 106 can include a negative DC bus and a positive DC bus, and the DC/DC converter 108 and the AC/DC converter 104 can be configured to distribute DC power evenly or unevenly between the negative DC bus and the positive DC bus.

For loads drawing AC power having a substantially sinusoidal waveform and a 0 Volt (V) DC offset, evenly distributing power between the two busses (i.e., the negative DC bus and the positive DC bus) is non-problematic, because a substantially identical amount of power is drawn from the negative DC bus and the positive DC bus. For example, power is drawn from a positive DC bus to produce a positive half-wave of the AC power, and power is drawn from a negative DC bus to produce a negative half-wave of the AC power. However, in typical prior art UPS's issues arise in the backup mode of operation when an internal battery is connected to a load that does not draw the same amount of power from each of the busses.

For example, a load drawing rectified half-wave AC power having a negative portion of the AC waveform suppressed will draw more power from the positive DC bus than from the negative DC bus. If the amount of power supplied from the battery to the positive DC bus is substantially identical to the amount of power supplied from the battery to the negative DC bus, yet more power is being drawn from the positive DC bus than from the negative DC bus, the DC busses will enter a state of imbalance in typical prior art UPS's. Imbalanced DC busses, characterized by a disparity in power levels between the DC busses giving rise to a voltage imbalance on the DC busses, give rise to a host of issues in these prior art systems including losses in efficiency, DC over-voltage conditions, and DC under-voltage conditions.

Problems may also arise in prior art UPS's in the normal mode of operation. As discussed above with respect to FIG. 1, during the normal mode of operation, AC input power supplied from the input 102 is converted to DC power by the AC/DC converter 104 and distributed to the one or more DC busses 106. For example, for AC input power having a substantially sinusoidal waveform and a 0 V DC offset, during a positive half-cycle of the input AC power the AC power is converted to DC power and supplied to a positive DC bus of the one or more DC busses 106, and during a negative half-cycle of the input AC power the AC power is converted to DC power and supplied to a negative DC bus of the one or more DC busses 106. Accordingly, the frequency at which power is supplied to the one or more DC busses 106 is directly related to the frequency of the input AC power in at least one example.

At least some of the input AC power supplied to the one or more DC busses 106 may be used to charge the battery 110. The DC/DC converter 108 may be configured to draw equal amounts of power from the negative DC bus and from the positive DC bus of the one or more DC busses 106, convert the DC power, and charge the battery 110 with the converted DC power.

In prior art systems, issues can occur during the normal mode of operation when the frequency at which an associated DC/DC converter alternately draws power from a negative DC bus and a positive DC bus is not synchronized with the frequency of the input AC power waveform received at an input. Because power received at the input is alternately supplied to the negative DC bus and the positive DC bus at a fixed frequency (i.e., at the frequency of the input AC power), the DC busses will enter a state of imbalance if the DC/DC converter is not configured to alternately draw power from the DC busses at the same frequency at which power is supplied to the DC busses. As discussed above with respect to the backup mode of operation, an imbalance of power on the DC busses in the normal mode of operation may similarly lead to several issues including, for example, losses in efficiency.

In the UPS 100, a solution is provided to maintain a balance of power between multiple DC busses (e.g., including a positive DC bus and a negative DC bus) to improve efficiency over prior art UPS's such as those discussed above. At least some embodiments disclosed herein provide UPS's and power converters that improve the voltage balance on multiple DC busses and improve the converter efficiency. For example, exemplary DC/DC converters as described herein are capable of exchanging power with one or more DC busses at a selectable frequency. Additional embodiments described herein provide DC/DC converters capable of selecting a subset of the one or more DC busses with which to exchange DC power.

Figure 2:
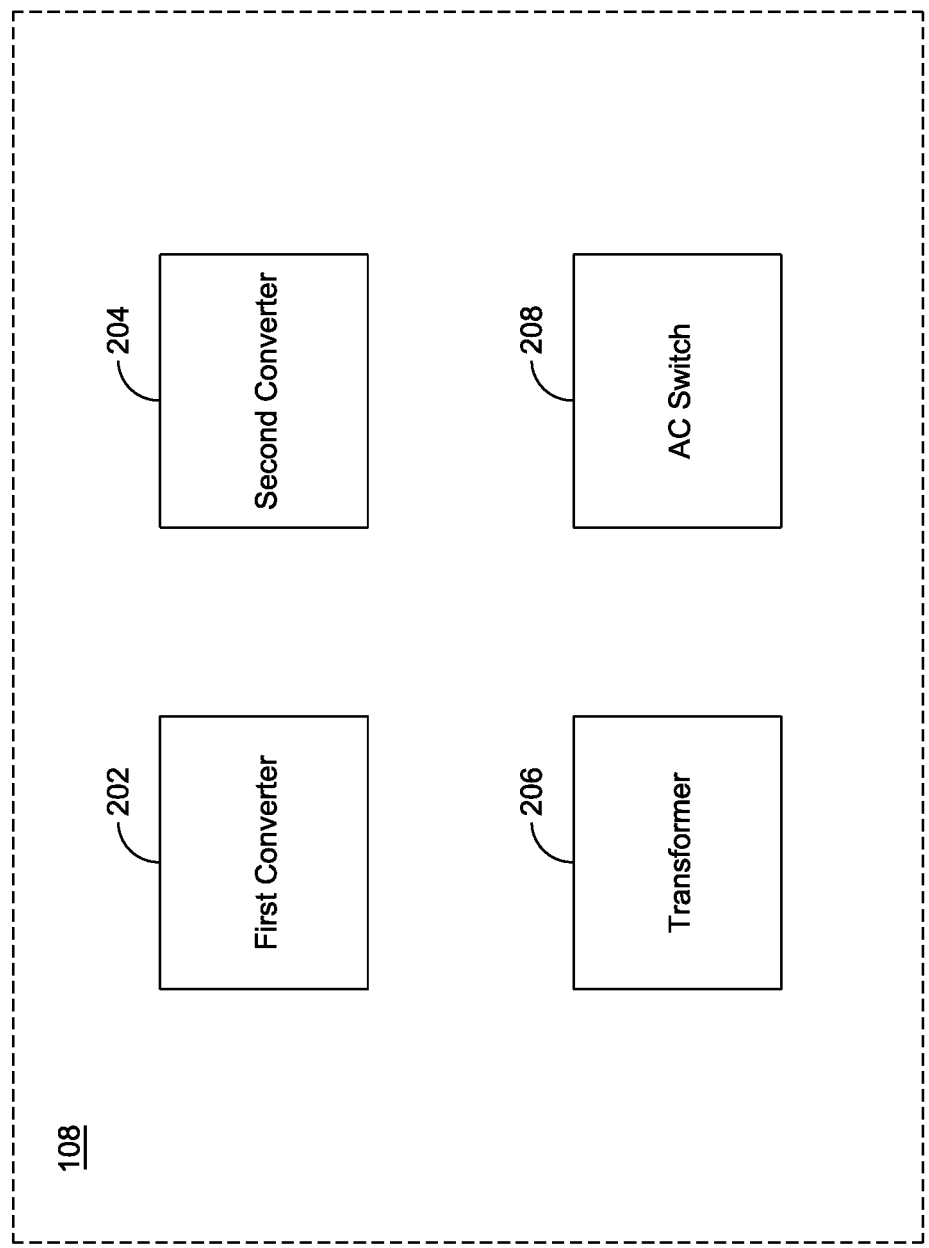
FIG. 2 is a block diagram of a DC/DC converter according to one example.

FIG. 2 illustrates a block diagram of one embodiment of the DC/DC converter 108 configured to address the foregoing issues. The DC/DC converter 108 includes a first converter 202, a second converter 204, a transformer 206, and an AC switch 208.

The DC/DC converter 108 may be configured to be coupled to a power source, such as the battery 110 discussed above, at an input terminal (not pictured) and may further be configured to be coupled to one or more DC busses, such as the one or more DC busses 106 discussed above, at an output terminal (not pictured). The first converter 202 and the second converter 204 are converters composed at least of one or more switches (e.g., Bipolar Junction Transistors [BJTs], Metal-Oxide-Semiconductor Field-Effect Transistors [MOSFETs], etc.). The first converter 202 and the second converter 204 may comprise one of several converter topologies including, for example, a current-fed push-pull converter, a voltage-fed push-pull converter, as well as other topologies.

The transformer 206 includes at least one primary winding and at least one secondary winding configured to provide power isolation and to buck or boost power levels. In other embodiments, other types of transformers may be used. The AC switch 208 includes one or more switches (e.g., BJTs, MOSFETs, Silicon-Controlled Rectifiers [SCRs], TRIodes for Alternating Current [TRIACs], etc.) which may be coupled directly together or positioned disparately from each other, as discussed in greater detail below with respect to FIGS. 3-7. The AC switch 208 is configured to control the exchange of power between the DC/DC converter 108 and components coupled thereto as a function of the operating mode of the DC/DC converter 108.

Figure 3:
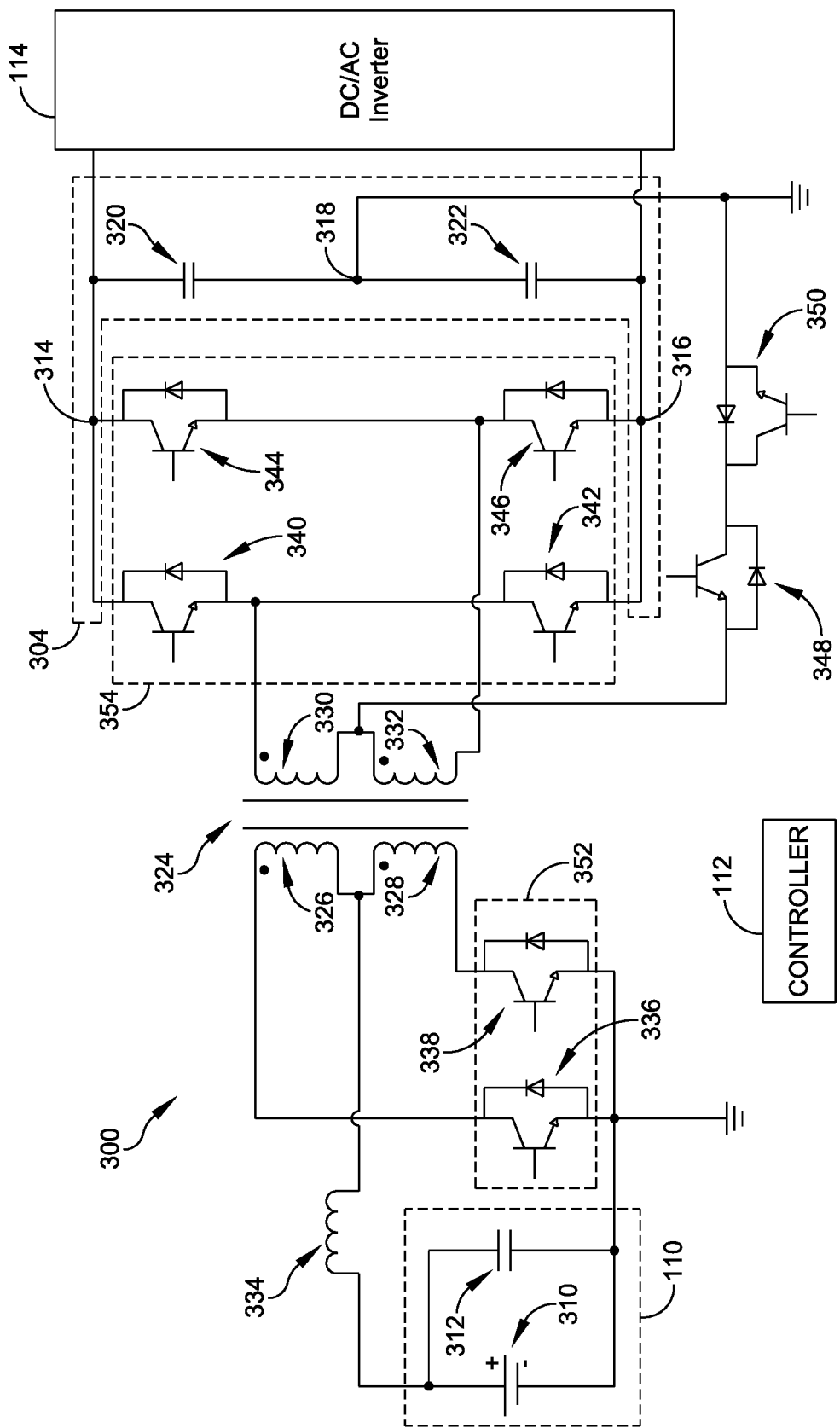
FIG. 3 is a circuit-level diagram of elements of a UPS according to one embodiment of the current invention.

FIG. 3 illustrates a circuit diagram of a DC/DC converter 300 that may be implemented as the DC/DC converter 108 in one embodiment. The DC/DC converter 300 is configured to be connected between the battery 110 and DC busses 304, and is further configured to be connected to the DC/AC inverter 114 via the DC busses 304. The DC/DC converter 300 is communicatively coupled to the controller 112. The battery 110 includes a DC battery 310 and a capacitor 312. The DC busses 304 are illustrative of one embodiment of the DC busses 106, and include a positive DC bus 314, a negative DC bus 316, a reference node 318, a first capacitor 320 and a second capacitor 322. The positive DC bus 314 is connected to the reference node 318 via the first capacitor 320, and the negative DC bus 316 is connected to the reference node 318 via the second capacitor 322. The positive DC bus 314 is further connected to a positive connection of the AC/DC converter 104 (not pictured) and the negative DC bus 316 is connected to a negative connection of the AC/DC converter 104 (not pictured).

The DC/DC converter 300 includes a transformer 324 (e.g., representative of one implementation of the transformer 206 discussed above) having a first side (e.g., a primary side, a secondary side, etc.) connected to the battery 110 via a first switch network 352 (e.g., representative of the first converter 202), and a second side (e.g., a secondary side, a primary side, etc.) connected to the DC busses 304 via a second switch network 354 (e.g., representative of the second converter 204). The first side of the transformer 324 includes a first primary winding 326 and a second primary winding 328, and the second side of the transformer 324 includes a first secondary winding 330 and a second secondary winding 332. Any use of "primary" and "secondary" with reference to transformer windings (e.g., of the transformer 324) is purely for pedagogical purposes and should not be construed to connote any specifications of the exemplary transformer. Either side of any transformer(s) disclosed herein may be configured as a primary side or as a secondary side as the term is understood in the art.

The first switch network 352 is generally configured as a current-fed push-pull converter in one embodiment, and includes a first switch 336 and a second switch 338 coupled to an inductor 334. The second switch network 354 is generally configured as a voltage-fed push-pull converter in one embodiment, and includes a third switch 340, a fourth switch 342, a fifth switch 344, and a sixth switch 346. The DC/DC converter 300 further includes a seventh switch 348 and an eighth switch 350, collectively representative of one implementation of the AC switch 208, coupled between the transformer 324 and the DC busses 304. Each of the switches 336-350 includes an anti-parallel diode connected thereto. The controller 112 is configured to provide control signals to the switches 336-350.

As will be described in greater detail below, the controller 112 can be configured to detect, measure and monitor voltage levels of the first capacitor 320 and the second capacitor 322, and to provide control signals to one or more of the switches 336-350 to maintain a balance of the voltage levels of the first capacitor 320 and the second capacitor 322. In at least one example, maintaining a balance of the voltage levels of the first capacitor 320 and the second capacitor 322 can include manipulating one or more of the switches 336-350 such that the power drawn from each of the capacitors 320, 322 is roughly equivalent to the power provided to each of the capacitors 320, 322, thereby maintaining respective voltage levels at a substantially constant value. Stated differently, at least one implementation of the controller 112 is configured to provide control signals such that the capacitors 320, 322 resist a change in a respective net power level thereof, thereby maintaining substantially constant voltage levels on each of the capacitors 320, 322.

Using data stored in associated memory, the controller 112 is operable to execute one or more instructions that may result in manipulation of one or more switches' conductive states. In some examples, the controller 112 can include one or more processors or other types of controllers. The controller 112 may perform a portion of the functions discussed herein on a processor, and perform another portion using an Application-Specific Integrated Circuit (ASIC) tailored to perform particular operations. Examples in accordance with the present invention may perform the operations described herein using many specific combinations of hardware and software and the invention is not limited to any particular combination of hardware and software components.

As discussed above, the first switch network 352 may optionally be configured as a current-fed push-pull converter. According to one implementation of a current-fed push-pull converter, and with reference to the first switch network 352, the first switch 336 and the second switch 338 are configured to alternately transfer power. Stated differently, over the course of a full switching cycle of the current-fed push-pull converter, the first switch 336 may be configured to transfer power only during a first half of the full switching cycle, and the second switch 338 may be configured to transfer power only during a second half of the full switching cycle. In at least one example, the control of the first switch network 352 in the foregoing example is substantially independent of the state of the first capacitor 320 and the second capacitor 322.

In a first mode of operation generally referred to as a discharging mode of operation, the battery 110 is configured to discharge power stored therein to charge at least one of the first capacitor 320 and the second capacitor 322. As discussed above, voltage across the first capacitor 320, and therefore the voltage on the positive DC bus 314 relative to the reference node 318, is ideally substantially identical to the voltage across the second capacitor 322, and therefore the voltage on the negative DC bus 316 relative to the reference node 318, except for a difference in polarity. During the discharging mode of operation, the controller 112 is configured to control the second switch network 354 to maintain a balance of voltage on the positive DC bus 314 and the negative DC bus 316 by selectively providing power to one or both of the first capacitor 320 and the second capacitor 322.

In a first example, a power imbalance exists between the first capacitor 320 and the second capacitor 322 during the discharging mode of operation. For example, the imbalance may be caused by a connected load that requires rectified half-wave AC power having a negative portion of the AC power waveform suppressed. Accordingly, the load will draw more power from the first capacitor 320 via the positive DC bus 314 than from the second capacitor 322 via the negative bus 316, thereby leading to a higher voltage across the second capacitor 322 than across the first capacitor 320 if left unchecked. Responsive to detecting the voltage imbalance, the controller 112 is configured to provide control signals to the second switch network 354 to provide a greater supply of power to the first capacitor 320 via the positive DC bus 314.

Power can be supplied exclusively to the first capacitor 320 via the positive DC bus 314 over a complete switching cycle of the first switch network 352. As discussed above, in the first switch network 352, the first switch 336 and the second switch 338 are configured to alternately transfer power over the complete switching cycle. With respect to power transfer during a first half of the switching cycle, for example, the first switch 336 is closed while the second switch 338 is open, thereby creating a conductive path from the battery 110 through the inductor 334, the first primary winding 326, the first switch 336, and back to the battery 110. Current passes through the first primary winding 326, thereby inducing a current in the second secondary winding 332. To direct the current to the first capacitor 320, the controller 112 is configured to close the seventh switch 348 during the first half of the complete switching cycle, thereby creating a conductive path from the second secondary winding 332 through the anti-parallel diode of the fifth switch 344, the first capacitor 320, the anti-parallel diode of the eighth switch 350, the seventh switch 348, and back to the second secondary winding 332. Accordingly, power can be provided exclusively to the first capacitor 320 over a first half of the switching cycle.

With respect to power transfer during a second half of the complete switching cycle of the first switch network 352, the first switch 336 is opened while the second switch 338 is closed, thereby creating a conductive path in the first switch network 352 from the battery 110 through the inductor 334, the second primary winding 328, the second switch 338, and back to the battery 110. Current passes through the second primary winding 328, thereby inducing current in the first secondary winding 330. The controller 112 is configured to maintain the seventh switch 348 in a closed position during the second half of the complete cycle, thereby creating a conductive path from the first secondary winding 330 through the anti-parallel diode of the third switch 340, the first capacitor 320, the anti-parallel diode of the eighth switch 350, the seventh switch 348, and back to the first secondary winding 330. Accordingly, power is provided exclusively to the first capacitor 320 in the above-described configuration. Therefore, over a complete switching cycle of the first switch network 352, power may be provided exclusively to the positive DC bus 314 to charge the first capacitor 320.

In a second example, the load described above may be configured to draw more power from the second capacitor 322 than from the first capacitor 320 during the discharging mode of operation. Accordingly, it may be desirable to supply power exclusively to the second capacitor 322 over a complete cycle of the first switch network 352 to achieve a balance of the power stored in the first capacitor 320 and the second capacitor 322.

With respect to power transfer during a first half of the complete switching cycle of the first switch network 352, the first switch 336 is closed while the second switch 338 is opened to create a conductive path through the first primary winding 326 as discussed above, thereby inducing a current through the first secondary winding 330. To direct current to the second capacitor 322, the controller 112 is configured to close the eighth switch 350, thereby creating a conductive path from the first secondary winding 330 through the anti-parallel diode of the seventh switch 348, the eighth switch 350, the second capacitor 322, the anti-parallel diode of the fourth switch 342, and back to the first secondary winding 330. Accordingly, power is provided exclusively to the second capacitor 322 in the described configuration.

With respect to power transfer during the second half of the complete switching cycle of the first switch network 352, the first switch 336 is opened while the second switch 338 is closed to create a conductive path through the second primary winding 328 as discussed above, thereby inducing a current through the second secondary winding 332. The controller 112 is configured to maintain the eighth switch 350 in a closed position, thereby creating a conductive path from the second secondary winding 332 through the anti-parallel diode of the seventh switch 348, the eighth switch 350, the second capacitor 322, the anti-parallel diode of the sixth switch 346, and back to the second secondary winding 332. Accordingly, power is provided exclusively to the second capacitor 322 in the described configuration. Therefore, over a complete switching cycle of the first switch network 352, power may be provided exclusively to the second capacitor 322 to charge the second capacitor 322.

The foregoing configuration provides several advantages compared to existing solutions. For example, the frequency with which the seventh switch 348 and the eighth switch 350 alternate between a closed and an open position is low enough that switching losses are substantially negligible. Although the switching frequency of the second switch network 354 can be tuned to the switching frequency of the first switch network 352 in the foregoing examples, the switching frequency of the first switch network 352 is not fixed. Accordingly, the switching frequency of the AC switch 208 may be tuned to the input AC supply frequency in the normal mode of operation, and may be tuned to the output AC supply frequency in the backup mode of operation. The switching frequency of the first switch network 352 and the second switch network 354 is based on design parameters, with typical values in the kilohertz (kHz) range.

Furthermore, over a complete switching cycle of the second switch network 354, at least one of the seventh switch 348 and the eighth switch 350 is in a conducting state. Because a conductive path is substantially always present through the seventh switch 348 and the eighth switch 350, the voltage across the switches 348, 350 is relatively low at any single point in time. Accordingly, the switches 348, 350 can be selected to have a commensurately lower voltage rating than a pair of switches that are not configured to be consistently conducting and are therefore subjected to higher voltage levels.

Although in the foregoing examples only one of the capacitors 320, 322 has been depicted as being charged at any one time, in alternate embodiments both the first capacitor 320 and the second capacitor 322 may be simultaneously charged at similar or different rates.

Figure 9:
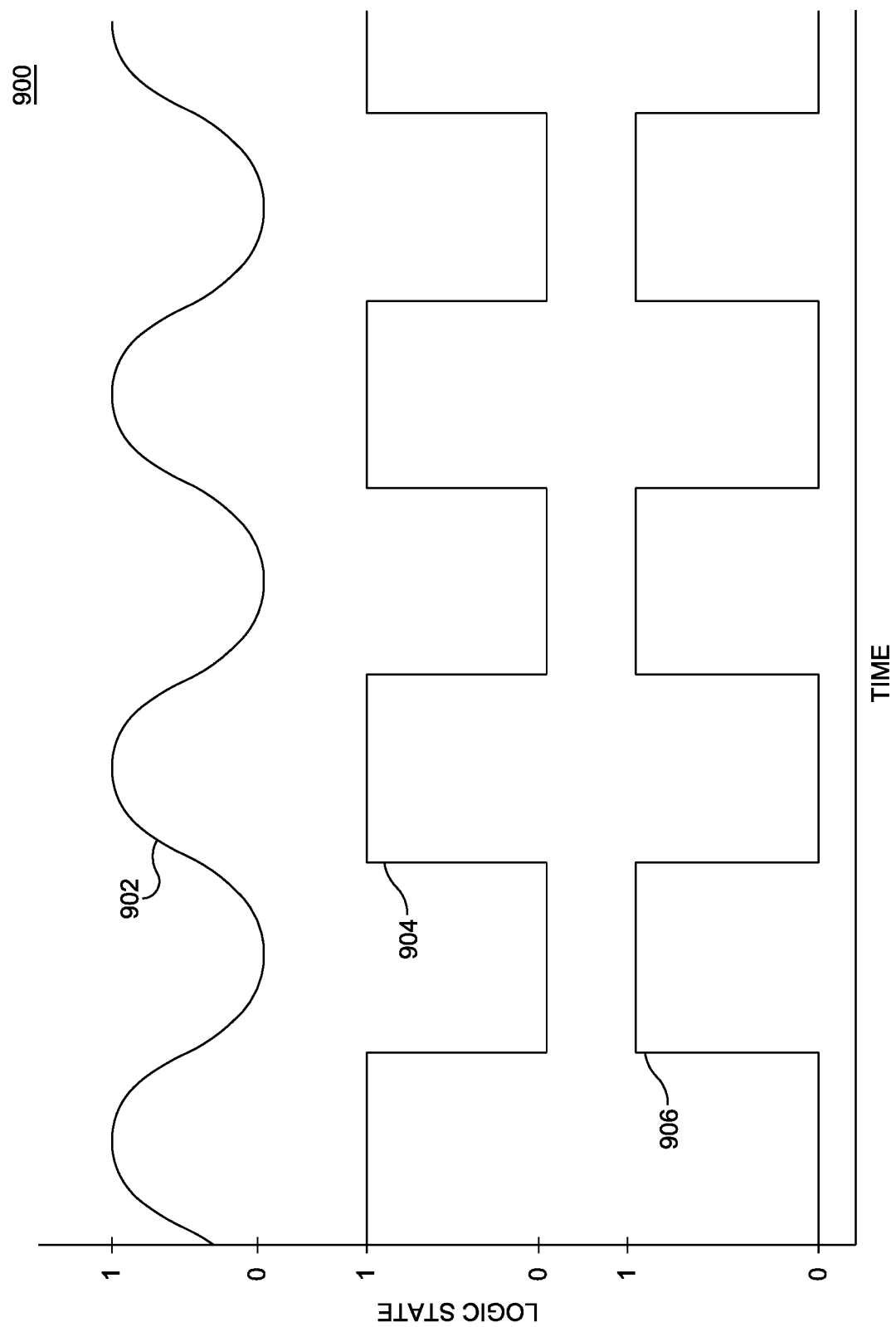
FIG. 9 is a timing diagram illustrating switch control signals according to one embodiment of the current invention.

FIG. 9 illustrates a timing diagram 900 of a synchronization signal 902, a first control signal 904 for the seventh switch 348, and a second control signal 906 for the eighth switch 350. The first control signal 904 represents a control signal sent by the controller 112 to actuate the seventh switch 348, and the second control signal 906 represents a control signal sent by the controller 112 to actuate the eighth switch 350. The first control signal 904 and the second control signal 906 are complementary in nature, such that when one of the signals is in a logic HIGH state, the other signal is in a logic LOW state. Stated differently, complementary signals are substantially 180° out of phase with one another.

The frequency of the first control signal 904 and the second control signal 906 is dependent upon synchronization signal 902, which in turn is dependent upon the mode of operation of the UPS 100. For example, if the UPS 100 is in the charging mode of operation, the frequency of the synchronization signal, and thus the first control signal 904 and the second control signal 906, may represent the frequency of the input power supply signal. Alternatively, if the UPS 100 is in the discharging mode of operation, the frequency of the synchronization signal 902 may represent the frequency of the output supply signal.

As discussed above, a voltage imbalance may also exist between the first capacitor 320 and the second capacitor 322 during the charging mode of operation. If the DC/DC converter 300 is disposed in a UPS having an input connected to, for example, an AC mains power supply (connections not illustrated), then power will be alternately supplied to the first capacitor 320 (e.g., during a positive half-cycle of the input AC power) and the second capacitor 322 (e.g., during a negative half-cycle of the input AC power) at the frequency of the input AC power. In at least one embodiment, the DC/DC converter 300 will synchronize the frequency at which the DC/DC converter 300 draws power from the first capacitor 320 and the second capacitor 322 with the frequency at which power is supplied by the AC mains power supply to the first capacitor 320 and the second capacitor 322.

As discussed above, the second switch network 354 can be configured as a voltage-fed push-pull converter. Over a complete switching cycle of the voltage-fed push-pull converter, the voltage-fed push-pull converter is configured in one embodiment to alternately supply power to the first secondary winding 330 and the second secondary winding 332 as discussed in greater detail below.

In a first example of the charging mode, the AC mains power supply provides power to the first capacitor 320 during a first half (e.g., a positive half-wave) of a complete period of the AC input power waveform. Responsive to detecting the voltage across the first capacitor 320, the controller 112 is operable to alternately direct current from the first capacitor 320 to the first secondary winding 330 and the second secondary winding 332.

To direct current from the first capacitor 320 to the first secondary winding 330, the controller 112 is operable to close the third switch 340 and the eighth switch 350, thereby creating a conductive path from the first capacitor 320 through the third switch 340, the first secondary winding 330, the anti-parallel diode of the seventh switch 348, the eighth switch 350, and back to the first capacitor 320. Current subsequently passes through the first secondary winding 330, thereby inducing a current in the second primary winding 328. Although both the first switch 336 and the second switch 338 are maintained in an open position, a conductive path is formed from the second primary winding 328 through the inductor 334, the battery 110, the anti-parallel diode of the second switch 338 and back to the second primary winding 328. Accordingly, power is supplied from the first capacitor 320 to charge the battery 110 via the first secondary winding 330 in the described configuration.

To direct current from the first capacitor 320 to the second secondary winding 332, the controller 112 is configured to maintain the eighth switch 350 in a closed position, and is further configured to close the fifth switch 344. A conductive path is thereby created from the first capacitor 320 through the fifth switch 344, the second secondary winding 332, the anti-parallel diode of the seventh switch 348, the eighth switch 350, and back to the first capacitor 320. Current subsequently passes through the second secondary winding 332, thereby inducing a current in the first primary winding 326. As discussed above, the first switch 336 and the second switch 338 are maintained in an open position. However, current passes through a conductive path from the first primary winding 326 through the inductor 334, the battery 110, the anti-parallel diode of the first switch 336, and back to the first primary winding 326. Accordingly, power is supplied from the first capacitor 320 to charge the battery 110 via the second secondary winding 332 in the above-described configuration.

In a second example of the charging mode, the AC mains power supply provides power to the second capacitor 322 during a second half (e.g., a negative half-wave) of a complete period of the AC input power waveform. Responsive to the voltage across the second capacitor 322, the controller 112 is operable to alternately direct current from the second capacitor 322 to the first secondary winding 330 and the second secondary winding 332.

To direct current from the second capacitor 322 to the first secondary winding 330, the controller 112 is operable to close the fourth switch 342 and the seventh switch 348, thereby creating a conductive path from the second capacitor 322 through the anti-parallel diode of the eighth switch 350, the seventh switch 348, the first secondary winding 330, the fourth switch 342, and back to the second capacitor 322. Current subsequently passes through the first secondary winding 330, thereby inducing a current in the first primary winding 326. Although both the first switch 336 and the second switch 338 are maintained in an open position, a conductive path is formed from the first primary winding 326 through the inductor 334, the battery 110, the anti-parallel diode of the first switch 336 and back to the first primary winding 326. Accordingly, power is supplied from the second capacitor 322 to charge the battery 110 via the first secondary winding 330 in the above-described configuration.

To direct current from the second capacitor 322 to the second secondary winding 332, the controller 112 is configured to maintain the seventh switch 348 in a closed position, and is further configured to close the sixth switch 346. A conductive path is thereby created from the second capacitor 322 through the anti-parallel diode of the eighth switch 350, the seventh switch 348, the second secondary winding 332, the sixth switch 346, and back to the second capacitor 322. Current subsequently passes through the second secondary winding 332, thereby inducing a current in the second primary winding 328. As discussed above, the first switch 336 and the second switch 338 are maintained in an open position. However, current passes through a conductive path from the second primary winding 328 through the inductor 334, the battery 110, the anti-parallel diode of the second switch 338, and back to the second primary winding 328. Accordingly, power is supplied from the second capacitor 322 to charge the battery 110 via the second secondary winding 332 in the above-described configuration.

Figure 10:
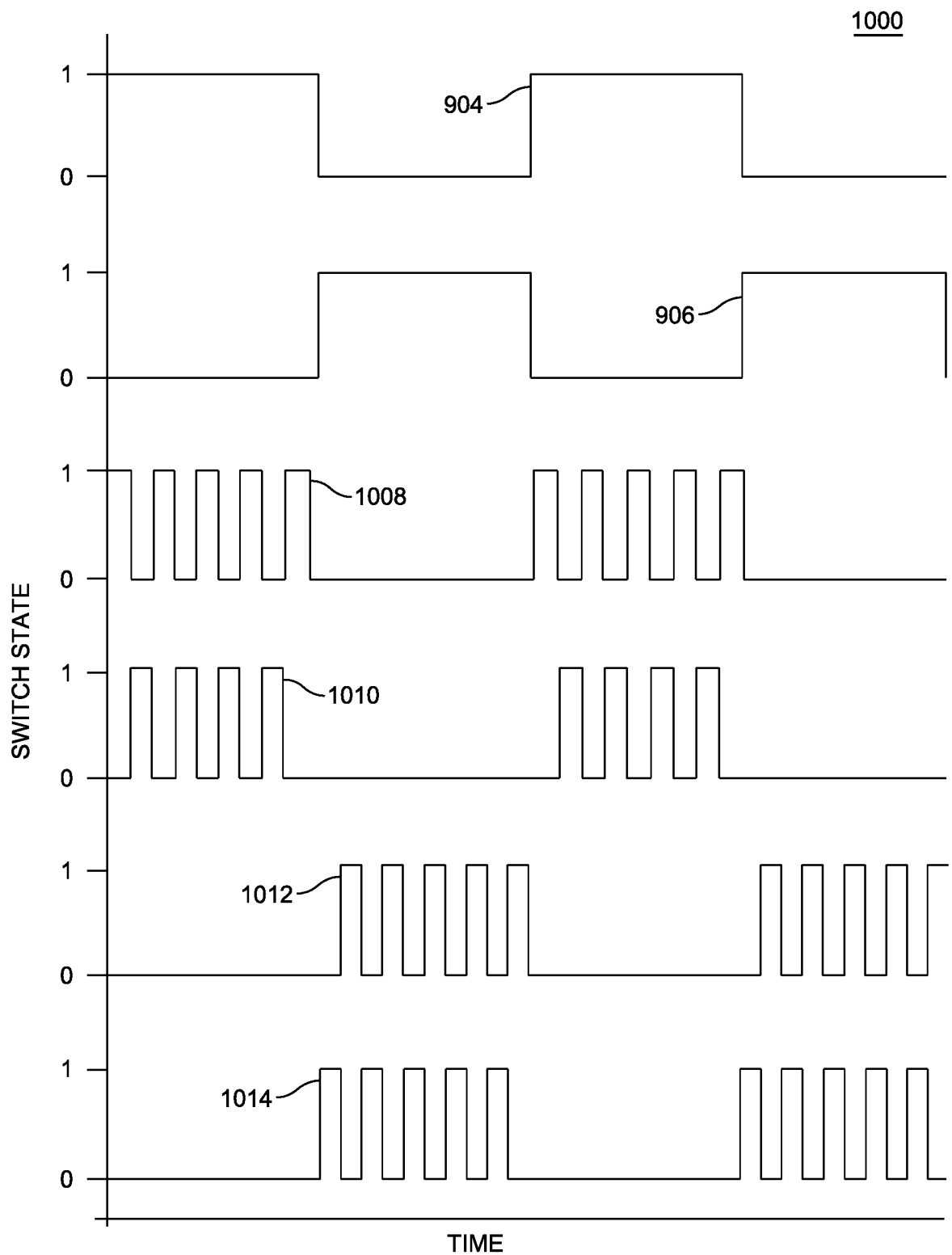
FIG. 10 is a timing diagram illustrating switch control signals according to one embodiment of the current invention.

FIG. 10 illustrates a timing diagram 1000 of switching signals in the charging mode. The timing diagram 1000 includes the first control signal 904 for the seventh switch 348, the second control signal 906 for the eighth switch 350, a third control signal 1008 for the fourth switch 342, a fourth control signal 1010 for the sixth switch 346, a fifth control signal 1012 for the third switch 340, and a sixth control signal 1014 for the fifth switch 344, where each of the control signals is configured to represent one of a logic LOW state and a logic HIGH state, and is indicative of a control signal sent by the controller 112 to actuate a respective switch.

As discussed above, the seventh switch 348 and the eighth switch 350 are controlled by complementary signals 904, 906 configured to alternately open and close the switches 348, 350 in synchronization with the synchronization signal 902. When the first control signal 904 is in a logic HIGH state, and the second control signal 906 is in a complementary logic LOW state, the third control signal 1008 and the fourth control signal 1010 are configured to alternate between logic HIGH and logic LOW states in logical complement to one another at a frequency higher than that of the synchronization signal 902. Stated differently, while the seventh switch 348 is in a closed position, the fourth switch 342 and the sixth switch 346 are configured to alternately conduct during the charging mode to draw power from the second capacitor 322. The second control signal 906, the fifth control signal 1012, and the sixth control signal 1014 remain in a logic LOW state, thereby maintaining the eighth switch 350, the third switch 340, and fifth switch 344 in an open position.

When the first control signal 904 is in a logic LOW state, and the second control signal 906 is in a complementary logic HIGH state, the fifth control signal 1012 and the sixth control 1014 are configured to alternate between logic HIGH and logic LOW states in logical complement to one another at a frequency higher than that of the synchronization signal 902. Stated differently, while the eighth switch 350 is in a closed position, the third switch 340 and the fifth switch 344 are configured to alternately conduct during the charging mode to draw power from the first capacitor 320. The first control signal 904, the third control signal 1008, and the fourth control signal 1010 remain in a logic LOW state, thereby maintaining the seventh switch 348, the fourth switch 342, and sixth switch 346 in an open position.

In embodiments discussed above, the battery 110 may be alternately charged during the charging mode of operation by the first capacitor 320 and the second capacitor 322. The charging intervals of the first capacitor 320 and the second capacitor 322 are be synchronized with the frequency of the input AC power received from an AC input source, such that an imbalance of voltage across the first capacitor 320 and the second capacitor 322 is reduced. Although the foregoing description characterizes the first capacitor 320 and the second capacitor 322 as alternately discharging, it is to be appreciated that the first capacitor 320 and the second capacitor 322 may also be simultaneously discharged, or only one of the capacitors 320, 322 may be discharged indefinitely.

Furthermore, although the timing diagram 1000 of FIG. 10 is directed to one example of the charging mode, similar timing diagrams apply to alternate examples of the charging mode, examples of the discharging mode, and so forth, whereby switches are actuated by signals sent by the controller 112.

In other embodiments, described below with respect to FIGS. 4-7, alternate circuit topologies may be implemented to achieve similar advantages discussed above, with minimal, if any, modifications to the control signals herein described.

Figure 4:
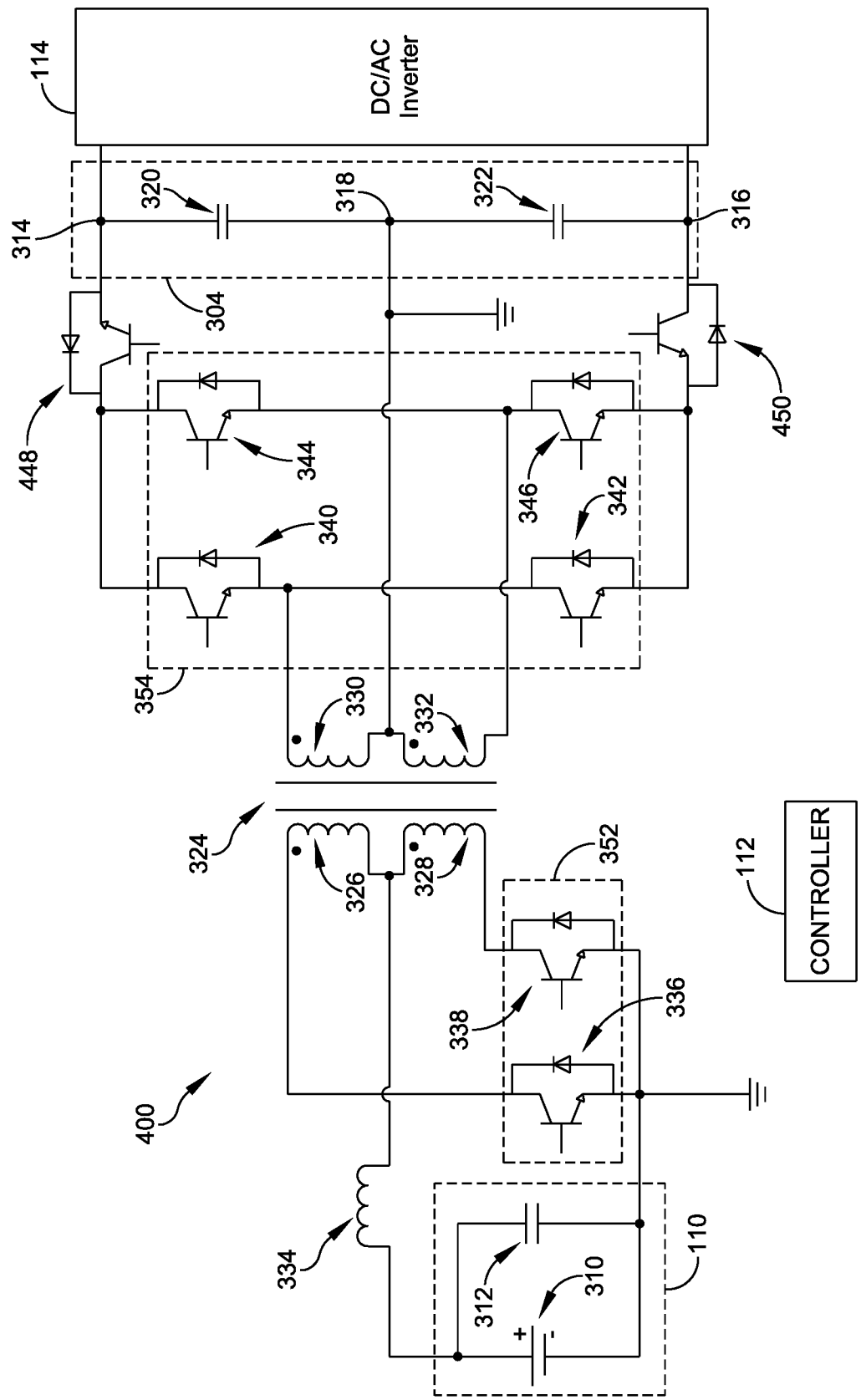
FIG. 4 is a circuit-level diagram of elements of a UPS according to another embodiment of the current invention.

FIG. 4 illustrates a DC/DC converter 400 according to an alternate embodiment of the DC/DC converter 108 in the UPS 100. In the illustrated embodiment, the DC/DC converter 400 comprises similar components as the DC/DC converter 300 and receives similar control signals from the controller 112. However, the connections of at least some of the components are altered relative to the DC/DC converter 300.

In the illustrated embodiment, the DC/DC converter 400 includes a seventh switch 448 and an eighth switch 450 in lieu of the seventh switch 348 and the eighth switch 350, respectively, discussed above with respect to FIG. 3. A first terminal of the seventh switch 448 is connected to a first terminal of the third switch 340 and a first terminal of the fifth switch 344. A second terminal of the seventh switch 448 is connected to a first terminal of the first capacitor 320 and is connected to the DC/AC inverter 114. A first terminal of the eighth switch 450 is connected to a first terminal of the second capacitor 322 and is connected to the DC/AC inverter 114. A second terminal of the eighth switch 450 is connected to a second terminal of the fourth switch 342 and a second terminal of the sixth switch 346. The reference node 318 is connected between the first secondary winding 330 and the second secondary winding 332 and is coupled between the first capacitor 320 and the second capacitor 322.

In the illustrated embodiment, a first terminal of each of the switches 336-346, 448 and 450 corresponds to a cathode terminal of an anti-parallel diode connected to each of the respective switches 336-346, 448 and 450, and a second terminal of each of the switches 336-346, 448 and 450 corresponds to an anode terminal of the anti-parallel diode connected to each of the respective switches 336-346, 448 and 450. In an alternate embodiment, a first terminal of each of the switches 336-346, 448 and 450 corresponds to an anode terminal of an anti-parallel diode connected to each of the respective switches 336-346, 448 and 450, and a second terminal of each of the switches 336-346, 448 and 450 corresponds to a cathode terminal of the anti-parallel diode connected to each of the respective switches 336-346, 448 and 450. In yet other embodiments, a first terminal of each of the switches 336-346, 448 and 450 refers to either an anode terminal of an anti-parallel diode or a cathode terminal of an anti-parallel diode connected to each of the switches 336-346, 448 and 450. Similarly, a second terminal of each of the switches 336-346, 448 and 450 refers to either an anode terminal of an anti-parallel diode or a cathode terminal of an anti-parallel diode connected to each of the switches 336-346, 448 and 450.

As discussed above, the controller 112 is configured to send similar control signals to the DC/DC converter 400 as those discussed above with respect to the DC/DC converter 300. In a first example, wherein the DC/DC converter 400 is in a charging mode, it may be desirable to provide power exclusively from the first capacitor 320, during a positive half-cycle of the AC power supply, to the battery 110. During a first half of the complete switching cycle, the controller 112 is configured to close the third switch 340, thereby creating a conductive path from the first capacitor 320, through the anti-parallel diode of the seventh switch 448, the third switch 340, the first secondary winding 330, and back to the first capacitor 320. Current passing through the first secondary winding 330 induces a current in the second primary winding 328, and the induced current passes through the inductor 334, the battery 110, the anti-parallel diode of the second switch 338, and back to the second primary winding 328. Accordingly, the DC/DC converter 400 is configured to charge the battery 110 exclusively from the first capacitor 320 via the second primary winding 328 and the first secondary winding 330 during the first half of the complete switching cycle.

During a second half of the complete switching cycle, the controller 112 is configured to provide control signals to the DC/DC converter 400 to close the fifth switch 344, thereby creating a conductive path from the first capacitor 320 through the anti-parallel diode of the seventh switch 448, the fifth switch 344, the second secondary winding 332, and back to the first capacitor 320. Current passing through the second secondary winding 332 induces a current in the first primary winding 326, and the induced current passes through the inductor 334, the battery 110, the anti-parallel diode of the first switch 336, and back to the first primary winding 326. Accordingly, the DC/DC converter 400 is configured to charge the battery 110 exclusively from the first capacitor 320 via the first primary winding 326 and the second secondary winding 332 during the second half of the complete switching cycle.

During a negative half-cycle of the AC power supply, and during a first half of the complete switching cycle, the controller 112 is configured to provide control signals to the DC/DC converter 400 to close the sixth switch 346, thereby creating a conductive path from the second capacitor 322 through the second secondary winding 332, the sixth switch 346, the anti-parallel diode of the eighth switch 450, and back to the second capacitor 322. Current passing through the second secondary winding 332 induces a current in the second primary winding 328, and the induced current passes through the inductor 334, the battery 110, the anti-parallel diode of the second switch 338, and back to the second primary winding 328. Accordingly, the DC/DC converter 400 is configured to charge the battery 110 exclusively from the second capacitor 322 via the second primary winding 328 and the second secondary winding 332 in the described configuration.

During the negative half of the AC power supply, and during a second half of the complete switching cycle, the controller 112 is configured to provide control signals to the DC/DC converter 400 to close the fourth switch 342, thereby creating a conductive path from the second capacitor 322 through the first secondary winding 330, the fourth switch 342, the anti-parallel diode of the eighth switch 450, and back to the second capacitor 322. Current passing through the first secondary winding 330 induces a current in the first primary winding 326, and the induced current passes through the inductor 334, the battery 110, the anti-parallel diode of the first switch 336, and back to the first primary winding 326. Accordingly, the DC/DC converter 400 is configured to charge the battery 110 exclusively from the second capacitor 322 via the first primary winding 326 and the first secondary winding 330 in the described configuration.

The DC/DC converter 400 can further be configured to charge the first capacitor 320 and the second capacitor 322 from the battery 110 in a second example. During a first time period of the second example, the battery 110 is configured to charge the first capacitor 320 via the first primary winding 326 and the second secondary winding 332. The controller 112 is configured to close the first switch 336, thereby creating a conductive path from the battery 110 through the inductor 334, the first primary winding 326, the first switch 336, and back to the battery 110 to induce a current in the second secondary winding 332. The controller 112 is further configured to close the seventh switch 448, thereby creating a conductive path for the induced current to pass from the second secondary winding 332 through the anti-parallel diode of the fifth switch 344, the seventh switch 448, the first capacitor 320, and back to the second secondary winding 332. Accordingly, the battery 110 is configured to charge the first capacitor 320 via the first primary winding 326 and the second secondary winding 332 during the first time period.

During a second time period, the battery 110 is configured to charge the first capacitor 320 via the second primary winding 328 and the first secondary winding 330. The controller 112 is configured to close the second switch 338, thereby creating a conductive path from the battery 110 through the inductor 334, the second primary winding 328, the second switch 338, and back to the battery 110 to induce a current in the first secondary winding 330. The controller 112 is further configured to close the seventh switch 448, thereby creating a conductive path for the induced current to pass from the first secondary winding 330, through the anti-parallel diode of the third switch 340, the seventh switch 448, the first capacitor 320 and back to the first secondary winding 330. Accordingly, the battery 110 is configured to charge the first capacitor 320 via the second primary winding 328 and the first secondary winding 330 during the second time period.

During a third time period, the battery 110 is configured to charge the second capacitor 322 via the first primary winding 326 and the first secondary winding 330. The controller 112 is configured to close the first switch 336, thereby creating a conductive path from the battery 110 through the inductor 334, the first primary winding 326, the first switch 336, and back to the battery 110 to induce a current in the first secondary winding 330. The controller 112 is further configured to close the eighth switch 450, thereby creating a conductive path for the induced current to pass from the first secondary winding 330 through the second capacitor 322, the eighth switch 450, the anti-parallel diode of the fourth switch 342, and back to the first secondary winding 330. Accordingly, the battery 110 is configured to charge the second capacitor 322 via the first primary winding 326 and the second primary winding 330 during the third time period.

During a fourth time period, the battery 110 is configured to charge the second capacitor 322 via the second primary winding 328 and the second secondary winding 332. The controller 112 is configured to close the second switch 338, thereby creating a conductive path from the battery 110 through the inductor 334, the second primary winding 328, the second switch 338, and back to the battery 110 to induce a current in the second secondary winding 328. The controller 112 is further configured to close the eighth switch 450, thereby creating a conductive path for the induced current to pass from the second secondary winding 332 through the second capacitor 322, the eighth switch 450, the anti-parallel diode of the sixth switch 346, and back to the second secondary winding 332. Accordingly, the battery 110 is configured to charge the second capacitor 322 via the second primary winding 328 and the second secondary winding 332 during the fourth time period.

The first, second, third and fourth time periods may be executed in any order. Each of the time periods has been identified numerically for pedagogical purposes only, and no temporal limitation is implied by the numbering of the first, second, third and fourth time periods.

Figure 5:
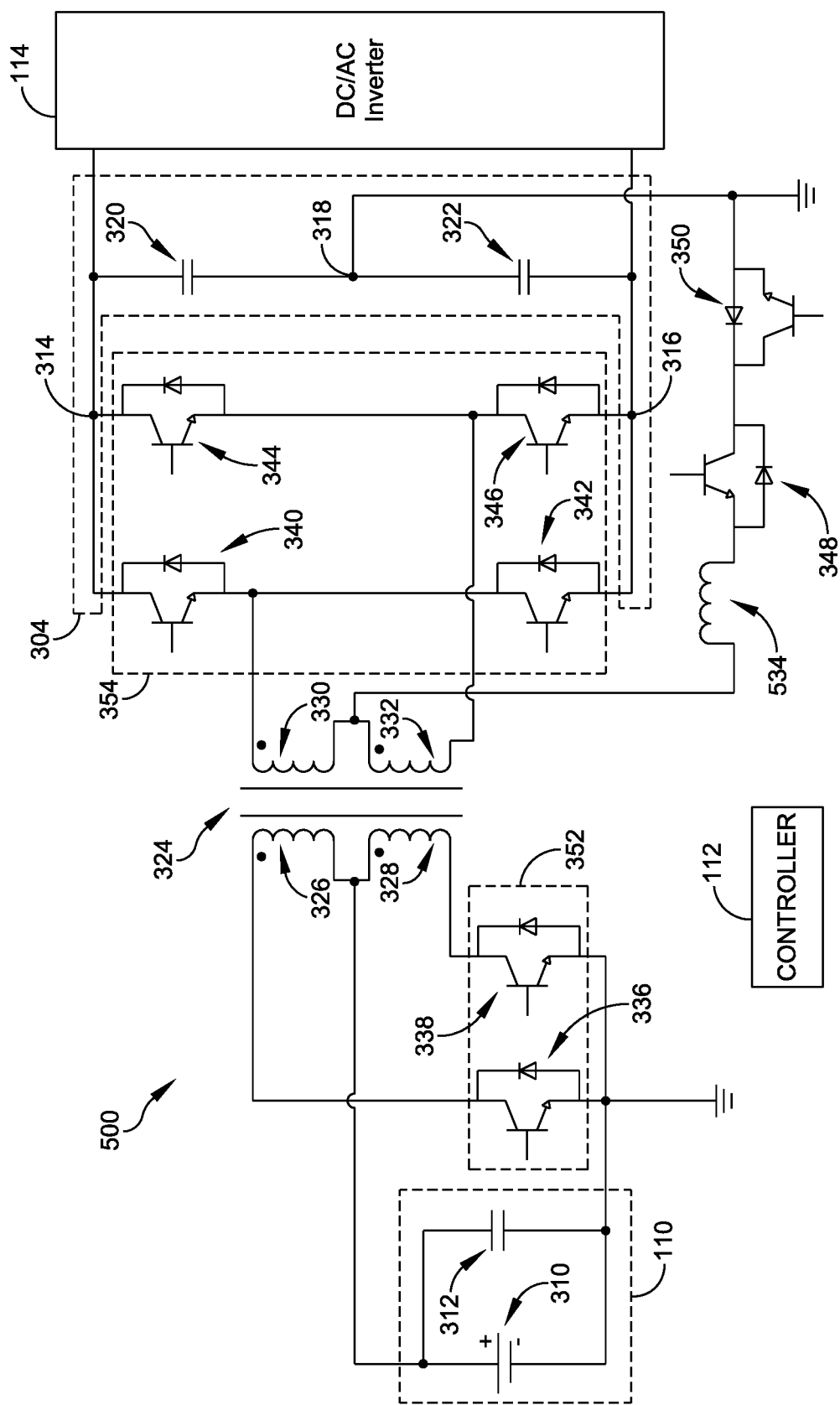
FIG. 5 is a circuit-level diagram of elements of a UPS according to another embodiment of the current invention.

FIG. 5 illustrates a DC/DC converter 500 according to another example that may be used as the DC/DC converter 108. In the illustrated embodiment, the DC/DC converter 500 comprises similar components to those of the DC/DC converter 300 and receives similar control signals from the controller 112. However, the connections of at least some of the components of the DC/DC converter 500 are altered relative to the DC/DC converter 300.

For example, the DC/DC converter 500 includes an inductor 534 in lieu of the inductor 334 depicted in the DC/DC converter 300. In the DC/DC converter 300, the inductor 334 is configured to be implemented in the first switch network 352. A first terminal of the inductor 334 is connected to the battery 110, and a second terminal of the inductor 334 is connected between the first primary winding 326 and the second primary winding 328. In the DC/DC converter 500, the inductor 534 is configured to be implemented in the second switch network 354. A first terminal of the inductor 534 is connected to the seventh switch 348, and a second terminal of the inductor 534 is connected between the first secondary winding 330 and the second secondary winding 332.

In one embodiment, the control signals provided by the controller 112 to the DC/DC converter 500 are substantially identical to the control signals provided by the controller 112 to the DC/DC converter 300. However, the alternate topology of the DC/DC converter 500 relative to the DC/DC converter 300, as characterized at least in part by the placement of the inductor 534 relative to the inductor 334, provides alternate operating characteristics to the DC/DC converter 500.

Figure 6:
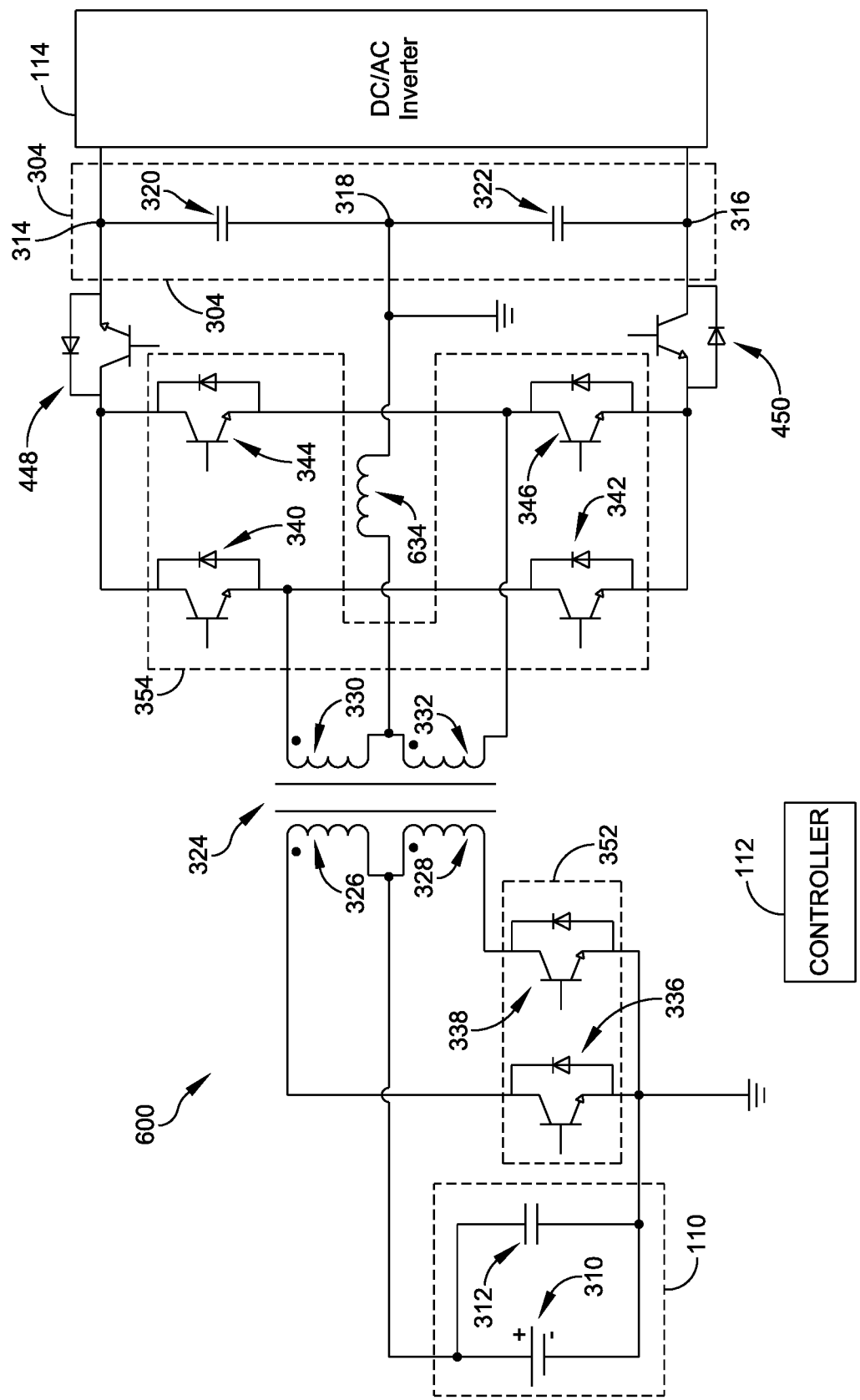
FIG. 6 is a circuit-level diagram of elements of a UPS according to another embodiment of the current invention.

FIG. 6 illustrates a DC/DC converter 600 according to another example that may be used as the DC/DC converter 108. In the illustrated embodiment, the DC/DC converter 600 comprises similar components to those of the DC/DC converter 400 and receives similar control signals from the controller 112. However, the connections of at least some of the components of the DC/DC converter 600 are altered relative to the DC/DC converter 400.

For example, the DC/DC converter 600 includes an inductor 634 in lieu of the inductor 334 depicted in the DC/DC converter 400. In the DC/DC converter 400, the inductor 334 is configured to be implemented in the first switch network 352. A first terminal of the inductor 334 is connected to the battery 110, and a second terminal of the inductor 334 is connected between the first primary winding 326 and the second primary winding 328. In the DC/DC converter 600, the inductor 634 is configured to be implemented in the second switch network 354. A first terminal of the inductor 634 is connected between the first capacitor 320 and the second capacitor 322, and a second terminal of the inductor 634 is connected between the first secondary winding 330 and the second secondary winding 332.

In one embodiment, the control signals provided by the controller 112 to the DC/DC converter 600 are substantially identical to the control signals provided by the controller 112 to the DC/DC converter 400. However, the alternate topology of the DC/DC converter 600 relative to the DC/DC converter 500, as characterized at least in part by the placement of the inductor 634 relative to the inductor 334, provides alternate operating characteristics to the DC/DC converter 600.

Figure 7:
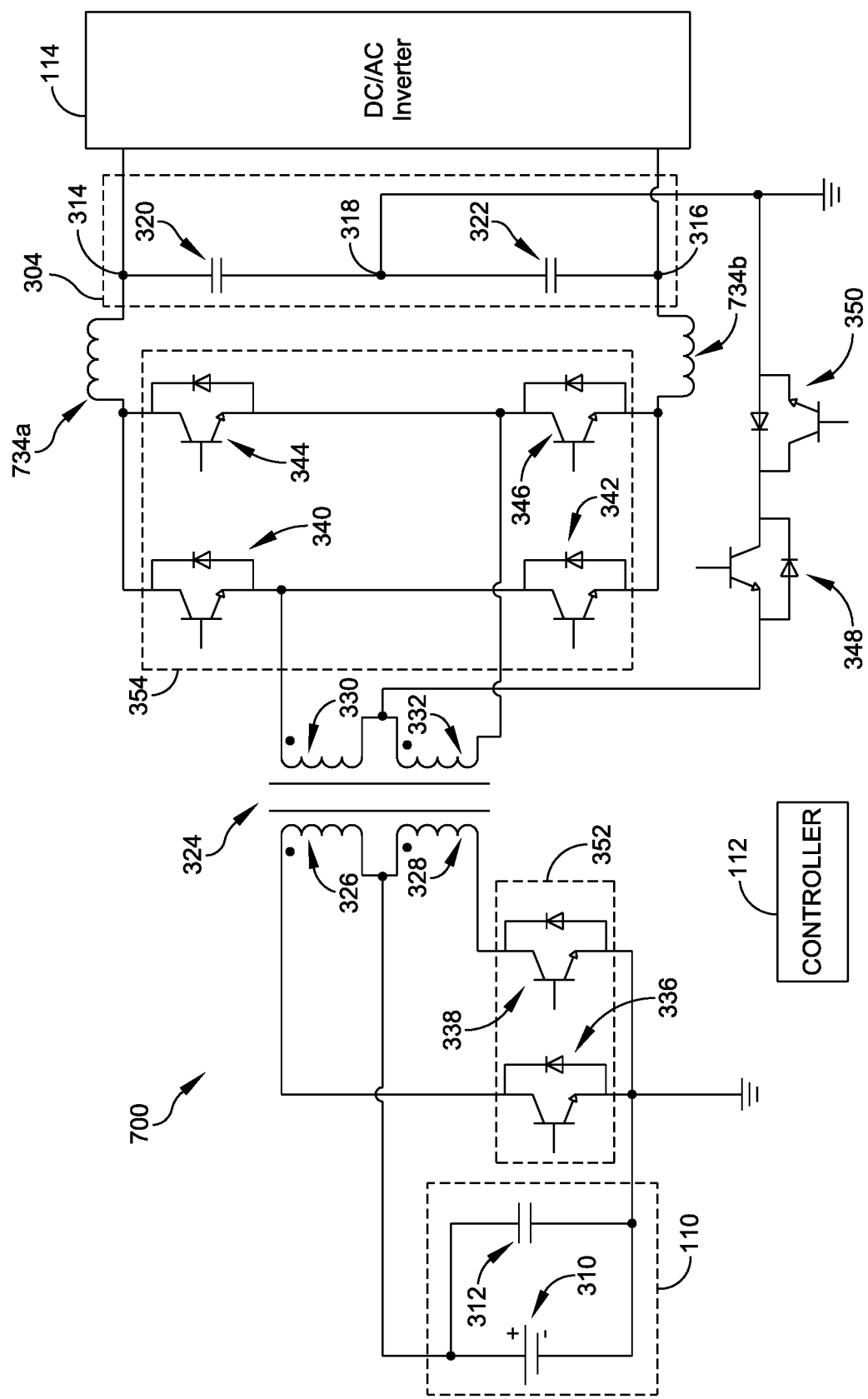
FIG. 7 is a circuit-level diagram of elements of a UPS according to another embodiment of the current invention.

FIG. 7 illustrates a DC/DC converter 700 according to another example that may be used in place of the DC/DC converter 108. In the illustrated embodiment, the DC/DC converter 700 comprises similar components as the DC/DC converter 300 and receives similar control signals from the controller 112. However, the connections of at least some of the components of the DC/DC converter 700 are altered relative to the DC/DC converter 400.

For example, the DC/DC converter 700 includes a first inductor 734a and a second converter 734b in lieu of the inductor 334. In the DC/DC converter 300, the inductor 334 is configured to be implemented in the first switch network 352. A first terminal of the inductor 334 is connected to the battery 110, and a second terminal of the inductor 334 is connected between the first primary winding 326 and the second primary winding 328.

In the DC/DC converter 700, the first inductor 734a and the second inductor 734b are configured to be coupled to the second switch network 354. A first terminal of the first inductor 734a is connected to the third switch 340 and the fifth switch 344, and a second terminal of the first inductor 734a is connected to the first capacitor 320 and the DC/AC inverter 114. A first terminal of the second inductor 734b is connected to the fourth switch 342 and the sixth switch 346, and a second terminal of the second inductor 734b is connected to the second capacitor 322 and the DC/AC inverter 106.

In one embodiment, the control signals provided by the controller 112 to the DC/DC converter 700 are similar to the control signals provided by the controller 112 to the DC/DC converter 300. However, the alternate topology of the DC/DC converter 700 relative to the DC/DC converter 500, as characterized at least in part by the placement of the inductors 734a and 734b relative to the inductor 534, provides alternate operating characteristics to the DC/DC converter 700.

Figure 8:
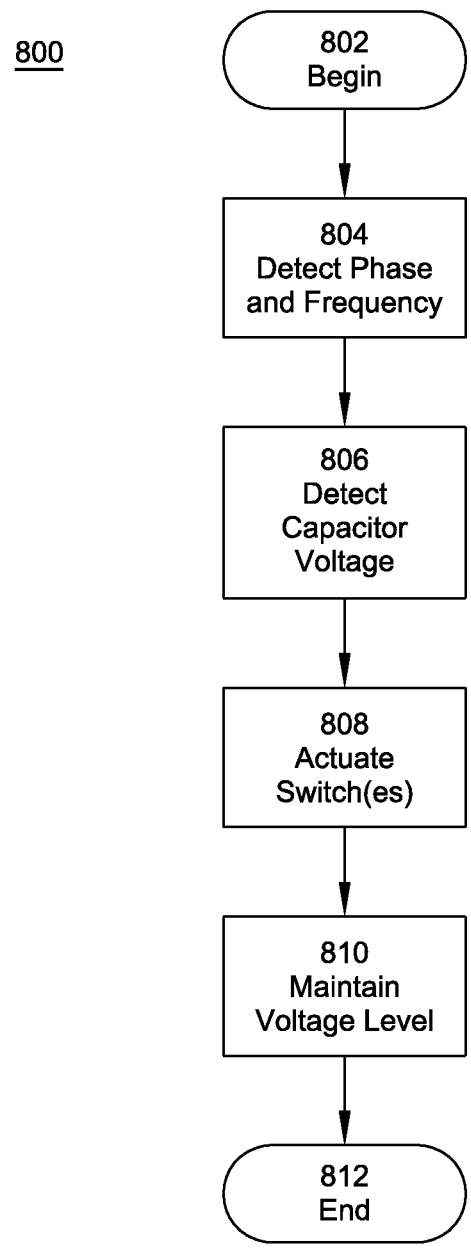
FIG. 8 is a flow chart illustrating a process for operating a UPS according to one embodiment of the current invention.

FIG. 8 illustrates a process 800 of balancing a voltage level of a capacitor (e.g., the first capacitor 320, the second capacitor 322, etc.) connected to a load (e.g., connected to the output 116) during the discharging mode of operation discussed above. The process 800 can be executed by the controller 112 and includes acts of detecting phase and frequency parameters for a load, detecting one or more voltage levels on a capacitor, actuating one or more switches, and maintaining, on the capacitor, a substantially constant voltage level. The controller 112 may execute the process 800 at least in any of the topologies discussed above with respect to FIGS. 3-7.

At act 802, the process 800 begins. At act 804, the controller 112 detects voltage phase and frequency requirements for a load connected to the output 116. For example, the controller 112 may detect that the output voltage requires a specific phase offset, and that the voltage must be supplied at a specific frequency. At act 806, the controller 112 detects one or more voltage levels on the capacitor. For example, the controller 112 may collect one or more voltage measurements and use the one or more voltage measurements to detect whether the voltage level on the capacitor is increasing, decreasing, or remaining the same. In alternate embodiments, the controller 112 may collect one or more current measurements in lieu of, or in addition to, the one or more voltage measurements to indirectly calculate the voltage level of the capacitor.

At act 808, the controller 112 provides control signals to one or more switches of the first switch network 352, the second switch network 354, and the AC switch 208 based on the voltage level the capacitor, and based on the phase and frequency requirements of the load. At act 810, the voltage level of the capacitor is maintained, for example, by compensating for a decrease or increase in the voltage level of the capacitor. At act 812, the process 800 ends.

By way of example, and with continued reference to FIG. 8, the process 800 may be executed with respect to the first capacitor 320 from which a load, connected to the output 116, is drawing power. At act 804, the controller 112 detects the output voltage phase and frequency requirements of the load. At act 806, the controller 112 detects one or more voltage levels of the first capacitor 320, and detects that a voltage level of the first capacitor 320 is decreasing. For example, the voltage level of the first capacitor 320 may decrease in the discharging mode of operation due to an increased power draw on the first capacitor 320 from a load connected to the DC/AC inverter 114.

At act 808, the controller 112 actuates one or more switches of the first switch network 352, the second switch network 354, and the AC switch 208 to create a conductive path from the battery 110 to the first capacitor 320. For example, the controller 112 may close the first switch 336 and the seventh switch 348, thereby creating a path from the battery 110 to the first capacitor 320 as discussed above at least with respect to FIG. 3, in accordance with voltage phase and frequency requirements of the load. At act 810, the voltage level of the first capacitor 320 is maintained by providing a first amount of power from the battery 110 to the first capacitor 320, the first amount of power being substantially equivalent to the amount of power drawn from the first capacitor 320 by the load. As discussed above, the controller 112 may modulate the state of the switches 336-350 such that power is evenly distributed between the primary windings and the secondary windings of the transformer 324. At act 812, the process 800 ends.

Although the foregoing example is directed to the discharging mode of operation, the process 800 may be executed in the charging mode of operation as well. For example, responsive to detecting an increase in the voltage level of the first capacitor 320 during the charging mode of operation, the controller 112 can actuate one or more of the switches 336-350 to discharge the first capacitor 320 to the battery 110. Accordingly, the voltage level of the first capacitor 320 may be maintained during the charging mode of operation and the discharging mode of operation.

Furthermore, although the foregoing examples have been directed to the first capacitor 320, the process 800 may similarly be executed to maintain a voltage level on the second capacitor 322 concurrently with, subsequent to, prior to, alternately with, or in lieu of executing the process 800 with respect to the first capacitor 320. An amount of power provided to the second capacitor 322 may be the same as, or different than, the amount of power provided to the first capacitor 320. In at least one example, it is ideal to maintain the first capacitor 320 and the second capacitor 322 at substantially equal voltage levels. Accordingly, the voltage levels of each of the first capacitor 320 and the second capacitor 322 must be maintained at constant voltage levels to preserve the equality of the voltage levels of the first capacitor 320 and the second capacitor 322.

It is to be understood, in light of the foregoing, that one or more switches' states may be manipulated to control the provision of power to and from one or more DC busses within a DC/DC converter. Individual control over each of the busses allows a distribution of power between the busses to be balanced, in that an amount of power drawn from each bus can be matched to the amount of power provided to each respective bus. Accordingly, a more balanced and efficient DC/DC converter is provided herein for implementation in any component utilizing a DC/DC converter, such as a UPS.

Furthermore, the aforementioned benefits may be achieved through more than one embodiment. For example, the DC/DC converters discussed above with respect to FIGS. 3-7 comprise substantially similar components to achieve substantially similar results (e.g., control of individual DC busses' voltage and power exchange). However, alternate design factors may occasion modification of the type, number, or configuration of components, as evidenced by the alternate but substantially similar embodiments discussed above. Although certain embodiments discussed above discuss the implementation of DC/DC converters in UPS's, the DC/DC converters discussed herein may be implemented in any suitable power device. The DC/DC converters discussed herein may output and receive a wide range of voltages, and are not bound to specific voltage value or values. While the DC/DC converters discussed herein have been described as being connected to an external power supply, such as an AC mains power supply, it is to be appreciated that the DC/DC converter may be coupled to any external or internal AC or DC power supply, or may not be coupled to any additional AC or DC power supply. Further, embodiments of devices described herein as operating from AC power or providing AC power may operate at a number of different AC line frequencies including 50 Hz and 60 Hz.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A power converter system comprising:
   a first switch circuit configured to receive a first Direct Current (DC) voltage;
   a second switch circuit, coupled to the first switch circuit, having a positive connection and a negative connection to receive a second DC voltage;
   a first capacitor coupled between the positive connection and a neutral point;
   a second capacitor coupled between the negative connection and the neutral point;
   an Alternating Current (AC) switch circuit coupled to the first capacitor and to the second capacitor;
   a transformer having at least one primary winding, a first secondary winding, and a second secondary winding, the at least one primary winding being coupled to the first switch circuit, and the first and second secondary windings being coupled to the second switch circuit and to the AC switch circuit; and
   a controller coupled to the first switch circuit, the second switch circuit, and the AC switch circuit and configured to:
      detect a voltage imbalance between the first capacitor and the second capacitor; and
      control the AC switch circuit to increase, responsive to detecting the voltage imbalance, an amount of power provided to one of the first capacitor and the second capacitor, wherein increasing the amount of power provided to one of the first capacitor and the second capacitor includes providing power from both the first secondary winding and the second secondary winding to avoid saturation of the transformer.

2. The power converter system of claim 1, wherein the controller is further configured to operate the first switch circuit, the second switch circuit, and the AC switch circuit to provide a first amount of power from a first voltage source providing the first DC voltage to the first capacitor and to provide a second amount of power from the first voltage source to the second capacitor, the first amount of power being substantially equal to an amount of power drawn from the first capacitor and the second amount of power being substantially equal to an amount of power drawn from the second capacitor.

3. The power converter system of claim 2, wherein the controller is further configured to operate the first switch circuit, the second switch circuit, and the AC switch circuit to provide a third amount of power to the first voltage source from the first capacitor and to provide a fourth amount of power to the first voltage source from the second capacitor, the third amount of power being based on an amount of power provided to the first capacitor from a second voltage source and the fourth amount of power being based on an amount of power provided to the second capacitor from the second voltage source.

4. The power converter system of claim 1, wherein the controller is further configured to operate the first switch circuit, the second switch circuit, and the AC switch circuit to provide, at a given time, power to at most one of the first capacitor and the second capacitor.

5. The power converter system of claim 1, wherein the controller is further configured to operate the first switch circuit, the second switch circuit, and the AC switch circuit to draw, at a given time, power from at most one of the first capacitor and the second capacitor.

6. The power converter system of claim 1, wherein the at least one primary winding includes a first primary winding and a second primary winding.

7. The power converter system of claim 6, wherein the controller is further configured to operate the first switch circuit, the second switch circuit, and the AC switch circuit to draw a first amount of power from the first capacitor and the second capacitor through the first primary winding and the first secondary winding, the first amount of power being balanced with a second amount of power drawn from the first capacitor and the second capacitor through the second primary winding and the second secondary winding.

8. The power converter system of claim 6, wherein the controller is further configured to operate the first switch circuit, the second switch circuit, and the AC switch circuit to provide a first amount of power to the first capacitor and the second capacitor through the first primary winding and the first secondary winding, the first amount of power being balanced with a second amount of power that is provided to the first capacitor and the second capacitor through the second primary winding and the second secondary winding.

9. A method of controlling a power converter including a transformer having at least one primary winding, a first secondary winding, and a second secondary winding, a first switch circuit coupled to the at least one primary winding, and a second switch circuit coupled to the first switch circuit and having a positive and negative connection, the method comprising:

detecting a first voltage across a first capacitor connected between the positive connection and a neutral connection;

detecting a second voltage across a second capacitor connected between the neutral connection and the negative connection;

detecting, based on the first voltage and the second voltage, a voltage imbalance between the first capacitor and the second capacitor; and actuating, responsive to detecting the voltage imbalance, a first set of one or more switches in at least one of the first switch circuit coupled to the at least one primary winding and the second switch circuit coupled to the first and second secondary windings and a second set of one or more switches in an alternating current (AC) switch circuit coupled to the first and second secondary windings to increase an amount of power provided to one of the first capacitor and the second capacitor, wherein in increasing the amount of power provided to one of the first capacitor and the second capacitor, power is provided from both the first secondary winding and the second secondary winding to avoid saturation of the transformer.

10. The method of claim 9, further comprising acts of:

detecting, in a first operating mode, a first amount of power provided to the first capacitor and a second amount of power provided to the second capacitor by a first voltage source;

actuating a third set of one or more of the switches in at least one of the first switch circuit and the second switch circuit; and providing, to a second voltage source, a third amount of power from the first capacitor and a fourth amount of power from the second capacitor responsive to the third set of one or more switches being actuated, the first amount of power being based on the third amount of power and the second amount of power being based on the fourth amount of power.

11. The method of claim 10, further comprising acts of:

detecting, in a second operating mode, a fifth amount of power drawn from the first capacitor and a sixth amount of power drawn from the second capacitor;

actuating a fourth set of one or more of the switches in at least one of the first switch circuit and the second switch circuit; and providing, from the second voltage source, a seventh amount of power to the first capacitor and an eighth amount of power to the second capacitor responsive to the fourth set of one or more switches being actuated, the fifth amount of power being based on the seventh amount of power and the sixth amount of power being based on the eighth amount of power.

12. The method of claim 9, further comprising acts of controlling the first switch circuit and the second switch circuit to provide power to a voltage source from at most one of the first capacitor and the second capacitor.

13. The method of claim 9, further comprising acts of controlling the first switch circuit and the second switch circuit to draw power from at most one of the first capacitor and the second capacitor.

14. The method of claim 9, further comprising acts of bidirectionally exchanging, by the first switch circuit and the second switch circuit, power with the second switch circuit and the first switch circuit, respectively, through the transformer, wherein the at least one primary winding includes a first primary winding and a second primary winding.

15. The method of claim 14, further comprising acts of operating the first switch circuit and the second switch circuit such that power provided by the first capacitor and the second capacitor through the first primary winding and the first secondary winding is balanced with power provided by the first capacitor and the second capacitor through the second primary winding and the second secondary winding.

16. The method of claim 14, further comprising acts of operating the first switch circuit and the second switch circuit such that power provided to the first capacitor and the second capacitor through the first primary winding and the first secondary winding is balanced with power provided to the first capacitor and the second capacitor through the second primary winding and the second secondary winding.

17. The method of claim 9, further comprising acts of maintaining a substantially constant voltage level across each of the first capacitor and the second capacitor.

18. A power converter system comprising:
a first switch circuit configured to receive a first Direct Current (DC) voltage;
a second switch circuit, coupled to the first switch circuit, having a positive connection and a negative connection to receive a second DC voltage;
a first capacitor coupled between the positive connection and a neutral point;
a second capacitor coupled between the negative connection and the neutral point;
a transformer having at least one primary winding, a first secondary winding, and a second secondary winding, the at least one primary winding being coupled to the first switch circuit, and the first and second secondary windings being coupled to the second switch circuit; and
means for detecting a voltage imbalance between the first capacitor and the second capacitor and increasing, responsive to detecting the voltage imbalance, an amount of power provided to one of the first capacitor and the second capacitor,
wherein increasing the amount of power provided to one of the first capacitor and the second capacitor includes means for providing power from both the first secondary winding and the second secondary winding to avoid saturation of the transformer.

19. The system of claim 18, wherein the first switch circuit is a current-fed push-pull converter, and the second switch circuit is a voltage-fed push-pull converter.

20. The system of claim 18, wherein the at least one primary winding includes a first primary winding and a second primary winding.

* * * * *